(12) United States Patent
Han et al.

(10) Patent No.: US 11,469,641 B2
(45) Date of Patent: Oct. 11, 2022

(54) ROTOR AND MOTOR COMPRISING SAME

(71) Applicant: LG INNOTEK CO., LTD., Seoul (KR)

(72) Inventors: Ji Hoon Han, Seoul (KR); Il Sik Won, Seoul (KR); Jin Seung Yoo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 296 days.

(21) Appl. No.: 16/636,142

(22) PCT Filed: Jul. 30, 2018

(86) PCT No.: PCT/KR2018/008590
§ 371 (c)(1),
(2) Date: Feb. 3, 2020

(87) PCT Pub. No.: WO2019/027196
PCT Pub. Date: Feb. 7, 2019

(65) Prior Publication Data
US 2020/0259391 A1    Aug. 13, 2020

(30) Foreign Application Priority Data

Aug. 3, 2017  (KR) .................. 10-2017-0098593
Sep. 6, 2017  (KR) .................. 10-2017-0113928

(51) Int. Cl.
*H02K 5/08*      (2006.01)
*H02K 11/215*    (2016.01)
(Continued)

(52) U.S. Cl.
CPC .............. *H02K 5/08* (2013.01); *H02K 1/30* (2013.01); *H02K 7/006* (2013.01); *H02K 11/215* (2016.01)

(58) Field of Classification Search
CPC ............ H02K 5/08; H02K 1/30; H02K 7/006; H02K 11/215; H02K 15/12; H02K 5/10
See application file for complete search history.

(56) References Cited

U.S. PATENT DOCUMENTS 3,865,639  A  *  2/1975  Bellot .................. C21D 9/50
                                            148/521
6,060,805  A      5/2000  Ohtake et al.
(Continued)

FOREIGN PATENT DOCUMENTS

JP        10-66293 A      3/1998
JP     2003-299279 A     10/2003
(Continued)

OTHER PUBLICATIONS

English_Translation_KR20160076729A (Year: 2022).*
(Continued)

*Primary Examiner* — Tulsidas C Patel
*Assistant Examiner* — Viswanathan Subramanian
(74) *Attorney, Agent, or Firm* — Birch, Stewart, Kolasch & Birch, LLP

(57) ABSTRACT

The present invention provides a rotor comprising: a rotor core; a plurality of magnets disposed outside the rotor core; and a molding part disposed outside the plurality of magnets, wherein the rotor core includes a plurality of guide protrusions disposed between the plurality of magnets, and the distance from the center of the rotor core to the outer surface of the molding part passing across the center of one of the guide protrusions is shorter than the distance from the same to the outer surface of the molding part passing across the center of one of the plurality of magnets.

12 Claims, 19 Drawing Sheets

(51) Int. Cl.
    *H02K 1/30*           (2006.01)
    *H02K 7/00*           (2006.01)

(56) References Cited

U.S. PATENT DOCUMENTS

| | | |
|---|---|---|
| 2007/0296297 A1 | 12/2007 | Jones et al. |
| 2008/0197738 A1 | 8/2008 | Leiber et al. |
| 2017/0141628 A1 | 5/2017 | Nose et al. |
| 2017/0358970 A1 | 12/2017 | Kim |

FOREIGN PATENT DOCUMENTS

| | | | |
|---|---|---|---|
| JP | 2009-106065 A | 5/2009 | |
| KR | 10-2010-0028476 A | 3/2010 | |
| KR | 10-2011-0072678 A | 6/2011 | |
| KR | 10-2016-0088033 A | 7/2015 | |
| KR | 10-2016-0076729 A | 7/2016 | |
| KR | 10-2016-0080503 A | 7/2016 | |
| KR | 10-2017-0032022 A | 3/2017 | |
| KR | 10-2017-0048015 A | 5/2017 | |
| WO | WO 2006/000260 A1 | 1/2006 | |
| WO | WO-2015048956 A2 * | 4/2015 | ............. H02K 11/38 |

OTHER PUBLICATIONS

English_Translation_KR20170032022A (Year: 2022).*
English_Translation_KR20110072678A (Year: 2022).*
English_Translation_WO2015048956A2 (Year: 2022).*

* cited by examiner

200

(b)

(a)

ROTOR AND MOTOR COMPRISING SAME

CROSS REFERENCE TO RELATED APPLICATIONS

This application is the National Phase of PCT/KR2018/008590 filed on Jul. 30, 2018, which claims priority under 35 U.S.C. § 119(a) to Patent Application Nos. 10-2017-0098593 and 10-2017-0113928 filed on Aug. 3, 2017 and Sep. 6, 2017 in Republic of Korea, all of which are hereby expressly incorporated by reference into the present application.

TECHNICAL FIELD

Embodiments related to a rotor and a motor including the same.

BACKGROUND ART

A transmission of a vehicle is a transmission system manually operated according to a user's clutch manipulation or automatically operated according to a velocity due to a transmission operation and includes a motor.

The motor of the transmission system may include a sensor magnet installed above a rotor. The sensor magnet has a ring shape including an outer circumferential surface and an inner circumferential surface. The sensor magnet is installed above the rotor and performs a function of indicating a position of the rotor. The sensor magnet and the rotor may be fixed using a cover. However, there is a problem that a weld line occurs on the cover during a process of injection molding the cover. Since weld lines cause cracks in the cover, it is preferable to minimize the weld lines.

Also, the rotor of the motor may include magnets. Magnets may be attached to an outer circumferential surface of a rotor core. In the case of the motor, due to a structural property thereof, a variety of protector types such as molding, cans, tubes, and the like are applied to improve durability of assembling magnets.

Among them, in the case of a can type, cans having a cup shape are coupled with an upper part and a lower part of an outer circumferential surface of a rotor so as to protect the rotor as well as prevent magnets from being detached.

However, in order to assemble the rotor inside the cans, it is necessary to apply an adhesive to insides of the cans. However, the operation of applying an adhesive makes a process of assembling the rotor complicated.

Meanwhile, in the case a molding type, chemical resistance is necessary such that there is a great limit in materials thereof and a risk of generating cracks is great.

DISCLOSURE

Technical Problem

The present invention is directed to providing a rotor capable of preventing a crack in a cover by minimizing weld lines of the cover and a motor including the rotor.

The present invention is directed to providing a motor capable of protecting magnets using a can without an operation of applying an adhesive thereto.

Aspects of the present invention are not limited to the above-stated aspects and other unstated aspects of the present invention will be understood by those skilled in the art from a following description.

Technical Solution

One aspect of the present invention provides a rotor including a rotor core, a plurality of magnets arranged outside the rotor core, and a cover disposed outside the plurality of magnets. Here, the rotor core includes a plurality of guide protrusions disposed between the plurality of magnets. Also, a distance from a center of the rotor core to an outer surface of the cover through a center of the guide protrusion is smaller than a distance from the center of the rotor core to the outer surface of the cover through a center of one of the plurality of magnets.

The rotor may further include a sensor magnet disposed above the rotor core. Here, the cover may be disposed outside the sensor magnet, and a thickness of the cover disposed outside the plurality of magnets on the basis of a radial direction of the center of the rotor core may be smaller than a thickness of the cover disposed outside the sensor magnet.

A cross section of the cover taken along a direction perpendicular to a longitudinal direction of the magnet may include a convex portion and a concave portion, and the convex portions and the concave portions may be alternately arranged.

A center of the concave portion may be disposed outside the rotor core.

The numbers of the convex portions, the magnets, and the guide protrusions may be equal to one another.

The distance from the center of the rotor core to the outer surface of the cover through the center of the guide protrusion may be smaller than a distance from the center of the rotor core to an outer surface of the magnet.

A shape of an outer circumferential surface of the mold portion may correspond to a shape of an outer circumferential surface of the magnet.

A curvature of the outer circumferential surface of the magnet and a curvature of an outer circumferential surface of the cover may include the same part.

A thickness of the convex portion may be equal to a thickness of the concave portion.

The concave portions may be arranged to be symmetrical on the basis of the center of the rotor core.

Another aspect of the present invention provides a motor including a shaft, a rotor including a hole in which the shaft is disposed, and a stator disposed outside the rotor. Here, the rotor includes a rotor core, a plurality of magnets arranged outside the rotor core, and a cover disposed outside the plurality of magnets. The rotor core includes a plurality of guide protrusions disposed between the plurality of magnets. Also, a distance from a center of the rotor core to an outer surface of the cover through a center of the guide protrusion is smaller than a distance from the center of the rotor core to the outer surface of the cover through a center of one of the plurality of magnets.

Still another aspect of the present invention provides a motor including a shaft, a rotor including a hole in which the shaft is disposed, and a stator disposed outside the rotor. Here, the rotor includes a rotor core coupled with the shaft, magnets coupled with the rotor core, and a can member surrounding the rotor core and the magnets. The can member includes groove portions. The groove portions are concavely disposed between the magnet and the magnet and on an outer circumferential surface of the can member toward a center of the rotor and arranged along a height direction of the can member. The can member includes a first can and a second can disposed at both ends of the rotor core. Also, the first can and the second can are arranged such that a bottom end of the groove portion of the first can comes into contact with a bottom end of the groove portion of the second can, and the first can and the second can include a first weld bead disposed through the bottom end of the groove portion of the first can and the bottom end of the groove portion of the second can.

The rotor core may include guide protrusions, and the guide protrusions may protrude from an outer circumferential surface of the rotor core in a radial direction of the rotor core and be arranged along an axial direction of the shaft.

The groove portion may include a bottom surface and sidewalls disposed on both ends of the bottom surface.

The groove portion may include a bottom surface and sidewalls disposed on both ends of the bottom surface, and the bottom surface of the groove portion may come into contact with the guide protrusions.

The sidewalls may be disposed to be spaced apart from the magnets.

The groove portion may forcibly fit in between the magnet and the magnet on the basis of a circumferential direction of the rotor.

A plurality of second weld beads may be disposed on the bottom surface of the groove portion.

A plurality of such groove portions may be arranged and be arranged to be symmetrical on the basis of the center of the rotor.

A distance from a center of the rotor core to an outer circumferential surface of the first weld bead may be smaller than a distance from the center of the rotor core to an outer circumferential surface of the magnet and be greater than a distance from the center of the rotor core to an outer circumferential surface of the groove portion.

The can member may come into surface contact with the guide protrusions.

Yet another embodiment of the present invention provides a method including attaching magnets to the rotor core, covering the rotor core with the can member such that the groove portion forcibly fits in between the magnet and the magnet, and welding a joint part between the first can and the second can.

Advantageous Effects

According to embodiments, an advantageous effect of preventing a crack in a cover by minimizing weld lines of the cover may be provided.

According to embodiments, an advantageous effect of excluding an operation of applying an adhesive to a can may be provided.

DESCRIPTION OF DRAWINGS

FIG. 14 is a horizontal cross-sectional view illustrating the rotor shown in

FIG. 12;

MODES OF THE INVENTION

Hereinafter, exemplary embodiments of the present invention will be described in detail with reference to the drawings.

However, the present invention is not limited to the embodiments disclosed below, but can be implemented in various forms. One or more of components of the embodiments may be selectively combined or substituted with one another without departing from the scope of the technical concept of the present invention.

Also, unless defined otherwise, the terms (including technical and scientific terms) used herein may be used as meanings capable of being commonly understood by one of ordinary skill in the art. Also, terms defined in generally used dictionaries may be construed in consideration of the contextual meanings of the related art.

Also, the terms used herein are intended to describe the embodiments but not intended to restrict the present invention.

Throughout the specification, unless stated otherwise particularly, singular forms include plural forms. When it is stated that at least one (or one or more) of A, B, and C, it may include one or more of all combinations of A, B, and C.

Also, in describing components of the embodiments of the present invention, the terms such as first, second, A, B, (a), (b), and the like may be used.

These terms are merely for distinguishing one element from another, and the essential, order, sequence, and the like of corresponding elements are not limited by the terms.

Also, when it is stated that one element is "connected," or "coupled" to another, the element may not only be directly connected or coupled to the other element but also be connected or coupled to the other element with another intervening element.

Also, when it is stated that an element is formed or disposed "above (on) or below (beneath)" another element, the two elements may not only come into direct contact with each other but also still another element may be formed or disposed between the two elements. Also, being "above (on)

or below (beneath)" may include not only being an upward direction but also being a downward direction on the basis of one element.

Figure 1:
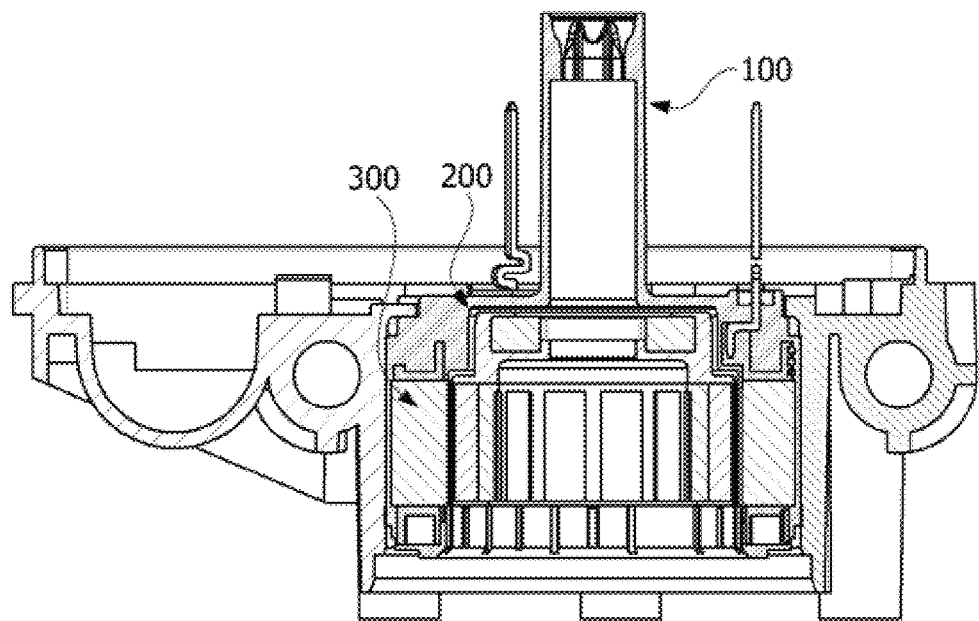
FIG. 1 is a view of a motor according to a first embodiment.

FIG. 1 is a view of a motor according to a first embodiment.

Referring to FIG. 1, the motor according to the first embodiment may include a shaft 100, a rotor 200, and a stator 300.

The rotor 200 and the stator 300 cause an electrical interaction. When the electrical interaction is caused, the rotor 200 rotates and the shaft 100 rotates in line therewith. The shaft 100 may be connected to a dual-clutch transmission (DCT) and provide power.

Here, unlike a single plate clutch transmission loaded in a conventional manual transmission vehicle, the DCT is a system with dual clutches in which first, third, and fifth gears may be implemented using power transmitted through one clutch and second, fourth, and sixth gears may be implemented using power transmitted through the other clutch.

The DCT may selectively receive power of the shaft 100.

The DCT has features of providing fuel efficiency higher than that of a conventional manual transmission vehicle as well as convenient drivability and a soft transmission sense like those of a conventional automatic transmission vehicle.

Figure 2:
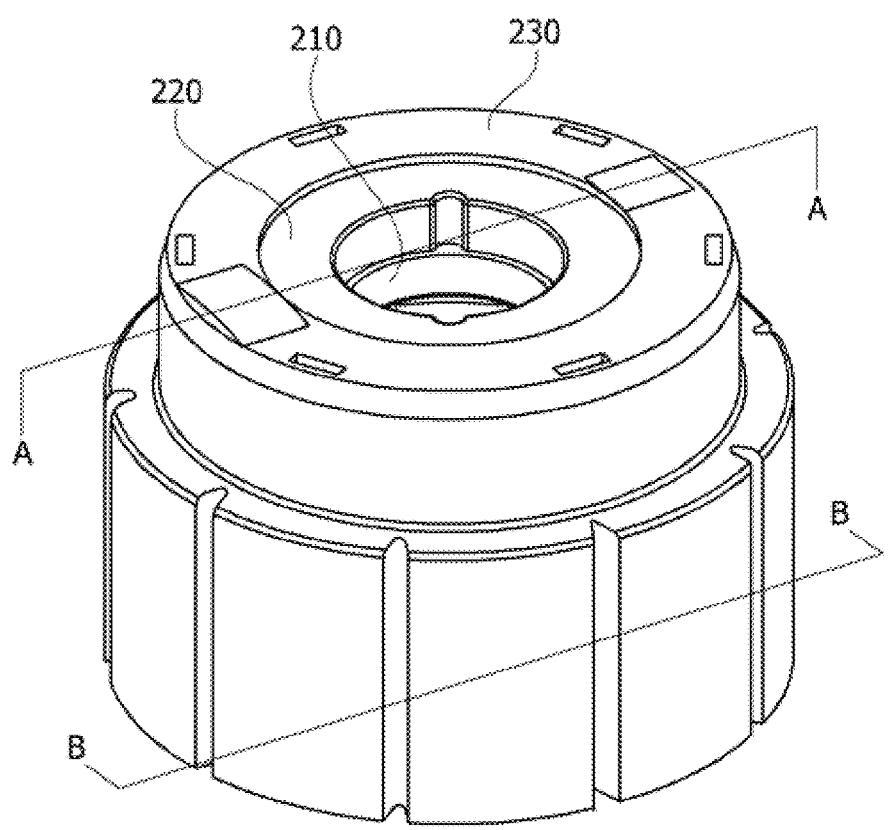
FIG. 2 is a view illustrating a rotor shown in FIG. 1.
Figure 3:
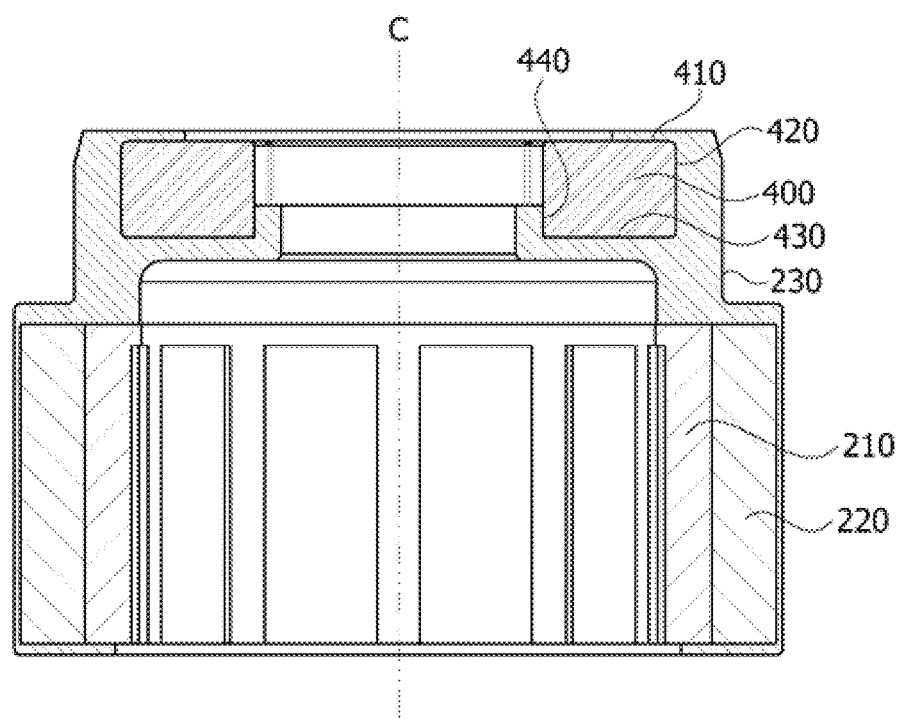
FIG. 3 is a side cross-sectional view of the rotor taken along line A-A of FIG. 2.

FIG. 2 is a view illustrating the rotor shown in FIG. 1, and FIG. 3 is a side cross-sectional view of the rotor taken along line A-A of FIG. 2.

Referring to FIGS. 2 and 3, the rotor 200 is disposed inside the stator 300.

The rotor 200 may include a rotor core 210, magnets 220, and a cover 230.

A sensor magnet 400 is disposed above the rotor core 210. The cover 230 combines the rotor core 210 with the sensor magnet 400. The sensor magnet 400 may be concentrically disposed above the rotor core 210. The magnets 220 may be coupled with an outer circumferential surface of the rotor core 210.

The sensor magnet 400 may be magnetized with a plurality of poles. The sensor magnet 400 is disposed above the rotor core 210 such that a center thereof is equal to a center C of the rotor core 210. The sensor magnet 400 performs a function of causing a signal for detecting a rotational position of the rotor core 210. The sensor magnet 400 is implemented in a ring shape. The sensor magnet 400 may include a hole in the center thereof through which the shaft 100 passes. Also, the sensor magnet 400 may include samarium cobalt.

The cover 230 combines the rotor core 210 with the sensor magnet 400. The cover 230 may be formed to surround both the rotor core 210 and the sensor magnet 400. The cover 230 may be formed through double injection while including the rotor core 210 and the sensor magnet 400. The cover 230 has a shape surrounding a top surface 410, an outer circumferential surface 420, a bottom surface 430, and an inner circumferential surface 440 of the sensor magnet 400. Here, the cover 230 may be embodied to surround only a part of the inner circumferential surface 440 of the sensor magnet 400 on the basis of an axial direction. Also, the cover 230 may be embodied to surround only a part of the top surface 410 in a radial direction on the basis of the center C of the sensor magnet 400. This is for securing pole detection performance of the sensor magnet 400.

Figure 4:
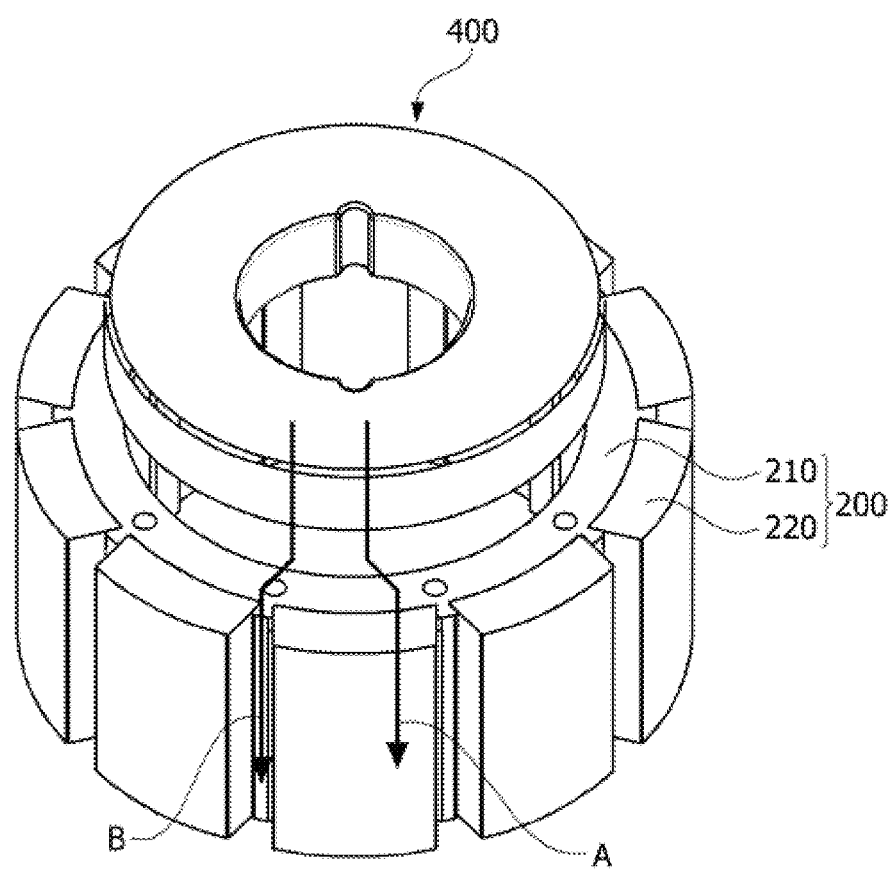
FIG. 4 is a view illustrating an injection flow.

FIG. 4 is a view illustrating an injection flow.

Referring to FIG. 4, injection molding is performed while the magnets 220 are attached to the outer circumferential surface of the rotor core 210 and the sensor magnet 400 is disposed above the rotor core 210. An injection gate is disposed above the sensor magnet 400 such that a mold material flows from an upper side on which the sensor magnet 400 is located to a lower side on which the rotor core 210 is located.

Here, an injection flow at the rotor 200 may be divided into an injection flow A which flows outside the magnets 220 and an injection flow B which flows between the magnet 220 and the magnet 220.

Figure 5:
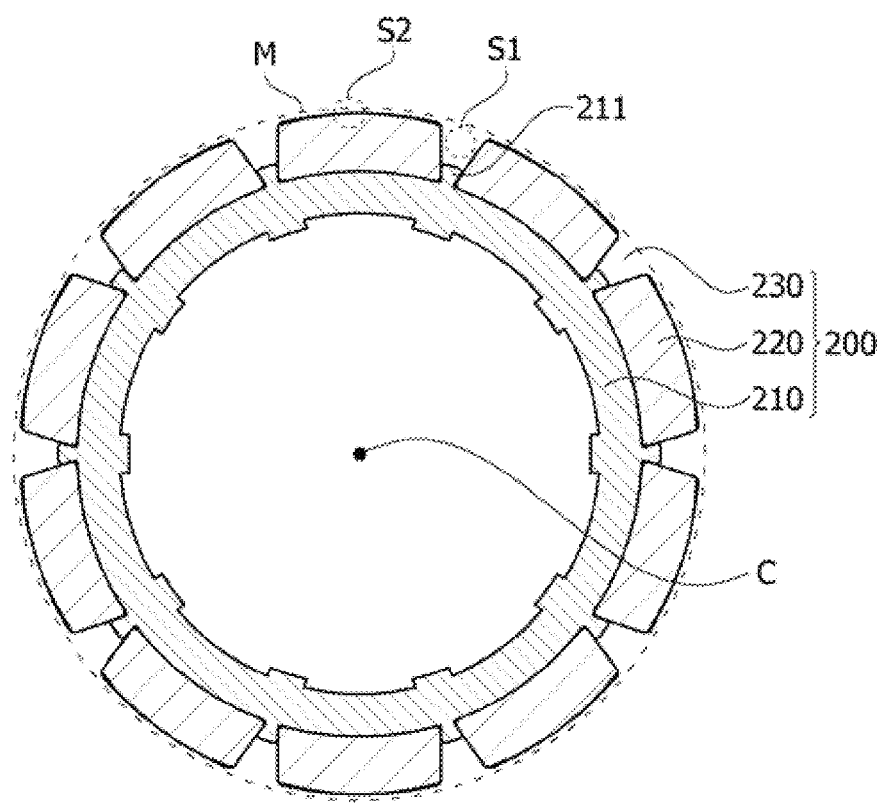
FIG. 5 is a top cross-sectional view of a rotor core and magnets taken along line B-B of FIG. 2.

FIG. 5 is a top cross-sectional view of a rotor core and magnets taken along line B-B of FIG. 2.

Referring to FIGS. 4 and 5, M of FIG. 5 is a boundary line which indicates an outer circumferential surface of a general cover. A first region S1 and a second region S2 have different injection flows.

The first region S1 is an area, in which a guide protrusion 211 is located, and corresponds to a space between the magnet 220 and the magnet 220. The injection flow B which flows between the magnet 220 and the magnet 220 proceeds toward the first region S1. The second region S2 corresponds to an outside of the magnet 220. The injection flow A which flows outside the magnet 220 proceeds toward the second region S2.

A fluid sectional area of the first region S1 is greater than a fluid sectional area of the second region S2. Accordingly, a mold material quickly moves downward in the first region S1 and relatively slowly moves downward in the second region S2. A weld line may occur in an axial direction due to a difference between a proceeding speed of the mold material in the first region S1 and a proceeding speed of the mold material in the second region S2.

Figure 6:
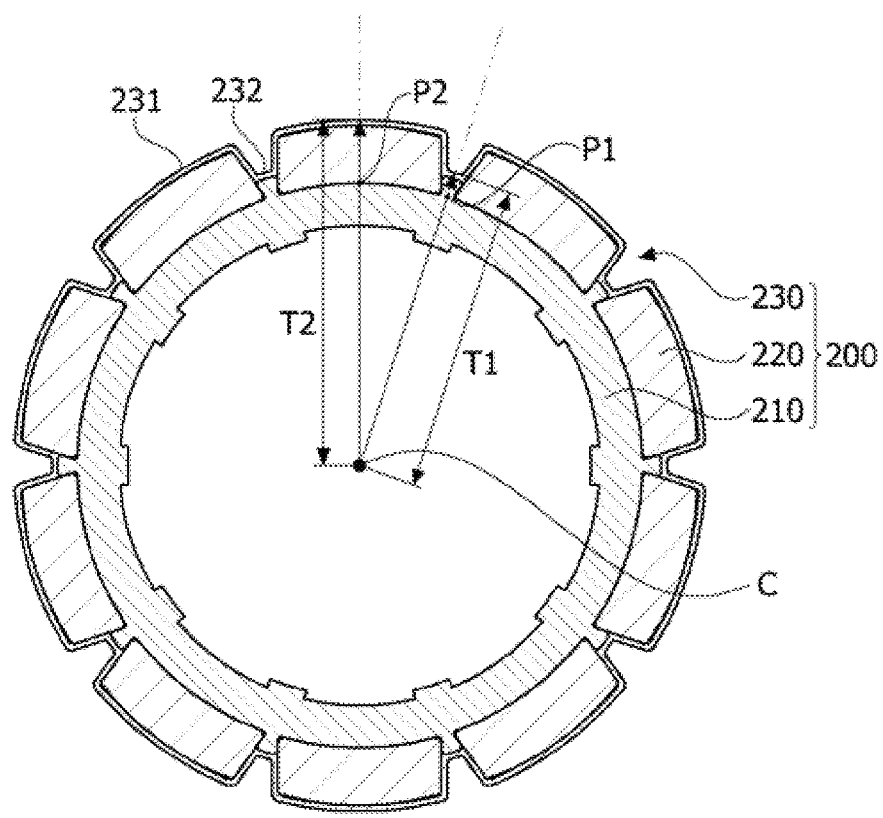
FIGS. 6 and 7 are top cross-sectional views of the rotor taken along line B-B of FIG. 2.
Figure 7:
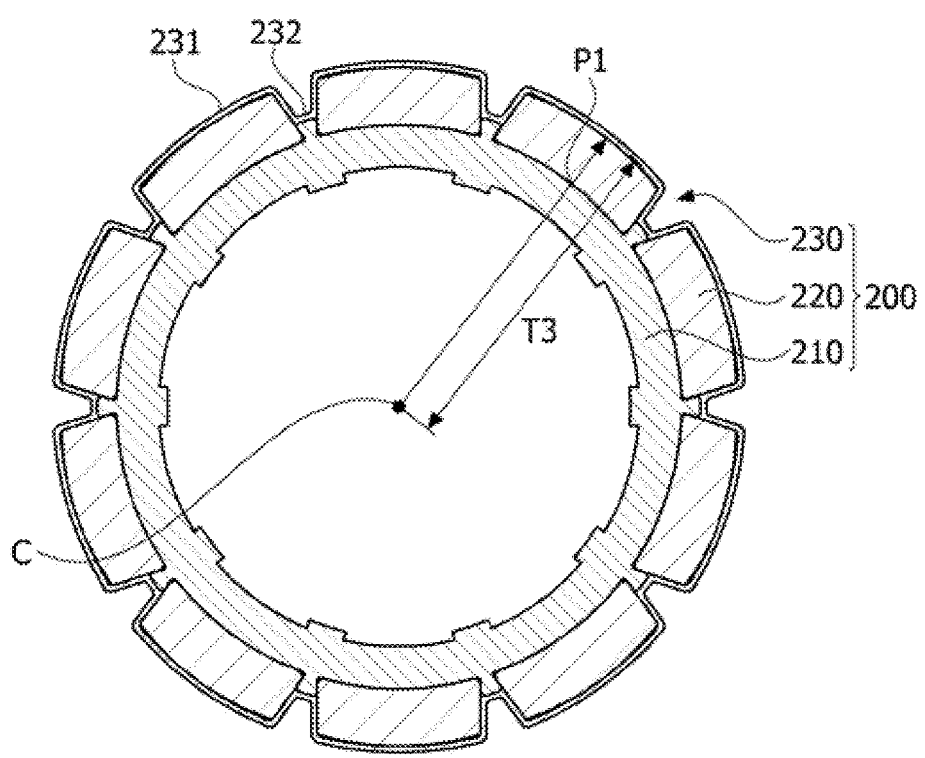

FIGS. 6 and 7 are top cross-sectional views of the rotor taken along line B-B of FIG. 2.

Referring to FIGS. 5 to 7, the cover 230 of the rotor 200 is intended to reduce the difference in the proceeding speed of the mold material in the first region S1 and the second region S2 by reducing the fluid sectional area in the first area S1 shown in FIG. 5.

A distance from the center C of the rotor core 210 to an outer surface of the cover 230 through a center P1 of the guide protrusion 211 is referred to as a first distance T1. A distance from the center C of the rotor core 210 to the outer surface of the cover 230 through a center P2 of the magnet 220 is referred to as a second distance T2. A distance from the center C of the rotor core 210 to an outer surface of the magnet 220 is referred to as a third distance T3.

The first distance T1 is formed to be smaller than the second distance T2 in the cover 230. In addition, the first distance T1 is formed to be smaller than the third distance T3.

Accordingly, the cover 230 may include a convex portion 231 and a concave portion 232. On the basis of a horizontal cross section of the cover 230 taken along in a direction perpendicular to a longitudinal direction of the magnet 220, the cover 230 may include the convex portion 231 disposed to protrude relatively outward and the concave portion 232 disposed to be concave relatively inward. The convex portions 231 and the concave portions 232 are alternately arranged along a circumferential direction of the rotor 200. A plurality of such concave portions 232 may be arranged to be symmetrical on the basis of the center of the rotor core 210. This is for keeping balance of the motor.

The convex portions 231 are arranged in the second region S2 (refer to FIG. 5) which is an area outside the magnet 220. The concave portions 232 are arranged in the first region S1 which is an area between the magnet 220 and the magnet 220. Accordingly, the number of the convex portions 231 is equal to the number of the magnets 220.

Also, the number of the convex portions 231 is equal to the number of the guide protrusions 211.

Figure 8:
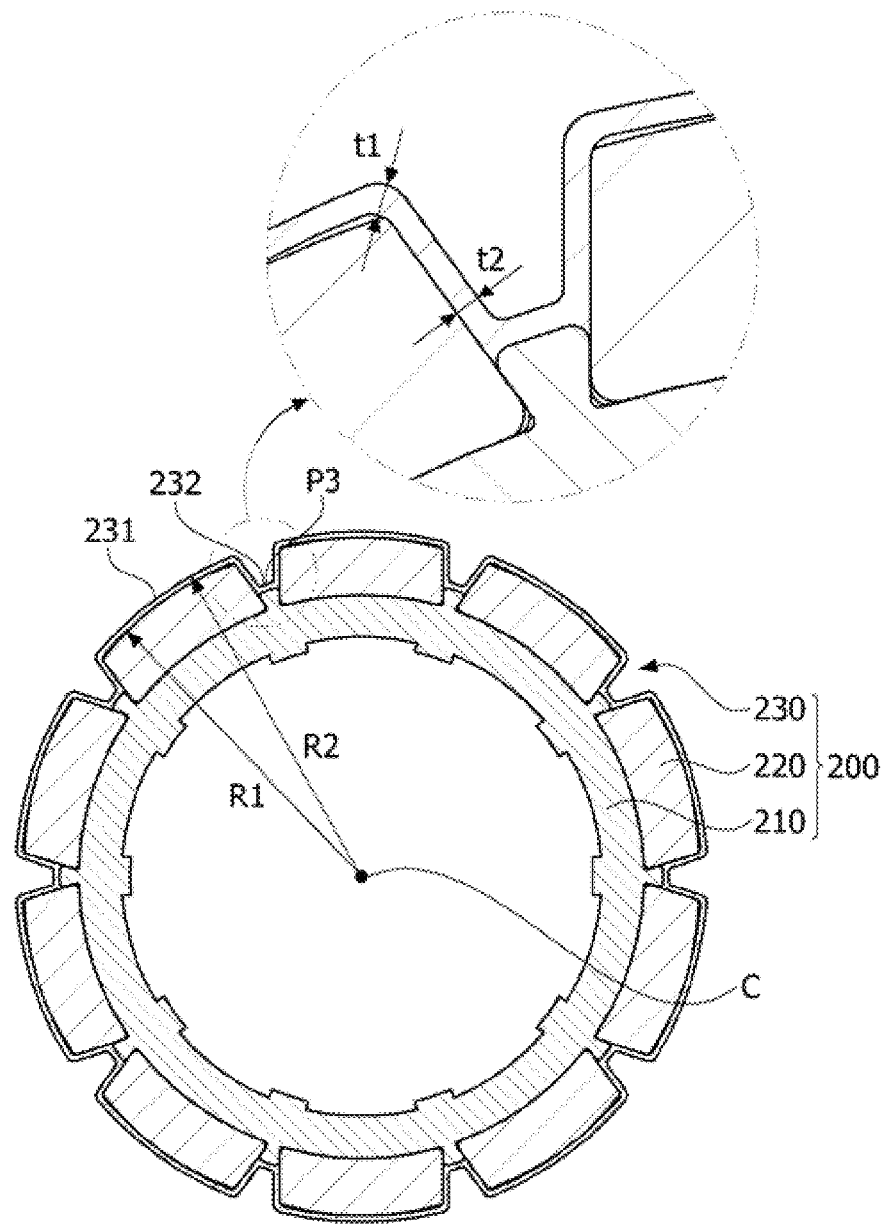
FIG. 8 is a view illustrating a thickness of a cover.

FIG. 8 is a view illustrating a thickness of a cover.

Referring to FIG. 8, a center P3 of the concave portion 232 may be disposed outside the rotor core 210.

A shape of an outer circumferential surface of the cover 230 may correspond to a shape of an outer circumferential surface of the magnet 220. For example, a part where a curvature R1 of the outer circumferential surface of the magnet 220 is equal to a curvature R2 of the outer circumferential surface of the cover 230 exists in the cover 230.

In a point of view on the basis of a thickness of the cover 230, a thickness t1 of the convex portion 231 may be equal to a thickness t2 of the concave portion 232. When the thickness t1 of the convex portion 231 is equal to the thickness t2 of the concave portion 232, since there is no difference between the proceeding speed of the mold material in the first region S1 and the proceeding speed of the mold material in the second region S2, occurrence of the weld line may be minimized.

Figure 9:
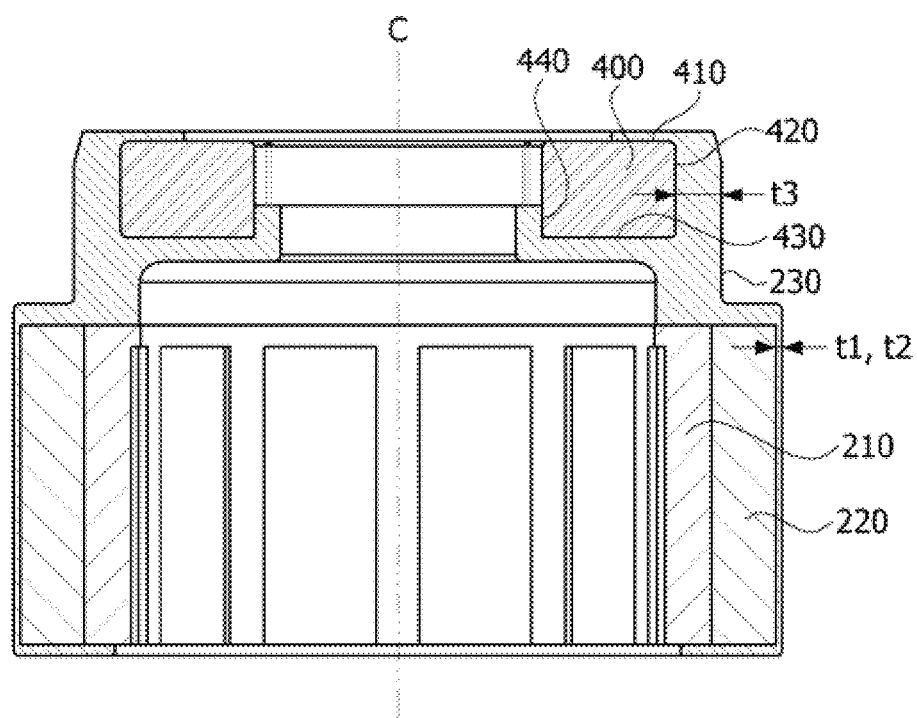
FIG. 9 is a view illustrating a thickness of the cover at a sensor magnet and a thickness of the cover at the rotor.

FIG. 9 is a view illustrating a thickness of the cover at the sensor magnet and a thickness of the cover at the rotor.

Referring to FIG. 9, a thickness t3 of the cover 230 disposed outside the sensor magnet 400 is greater than the thicknesses t1 and t2 of the cover 230 disposed outside the rotor core 210. Since the cover 230 disposed outside the sensor magnet 400 has a relatively greater thickness t3, even when a weld line occurs in a corresponding area, a possibility of occurrence of cracks is low.

Figure 10:
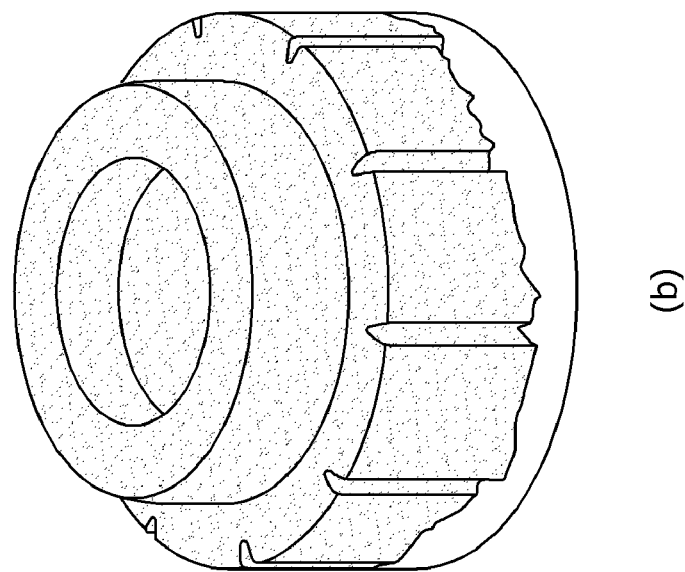
FIG. 10 is a view in which a proceeding status of a cover in a general rotor and a proceeding status of the cover in the rotor of the motor according to the first embodiment are compared.
Figure 10:
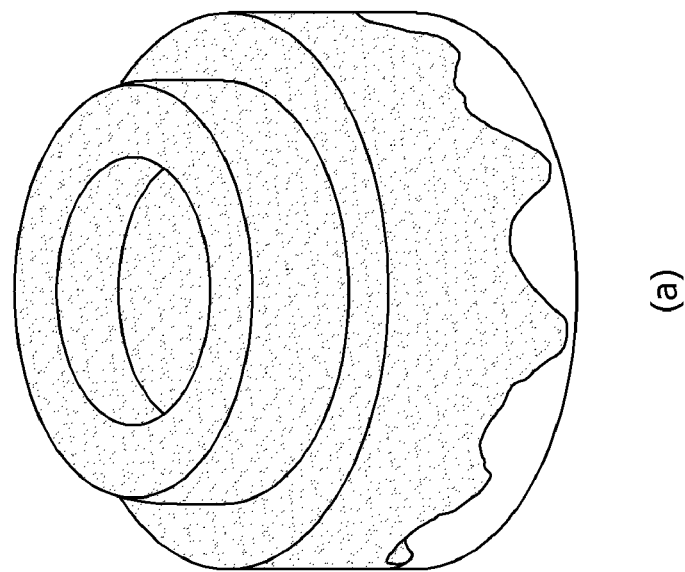

FIG. 10 is a view in which a proceeding status of a cover in a general rotor and a proceeding status of the cover in the rotor of the motor according to the first embodiment are compared.

FIG. 10A is a view illustrating the proceeding status of the cover in the general rotor.

Referring to FIG. 10A, it may be seen that the proceeding speed of the mold material in the first region S1 (refer to FIG. 5) is slower than the proceeding speed of the mold material in the second region S2 (refer to FIG. 5). This is because the fluid sectional area outside the magnet is smaller than the fluid sectional area between the magnet and the magnet.

FIG. 10B is a view in which the proceeding statuses of the cover in the rotor of the motor according to the first embodiment are compared.

Referring to FIG. 10B, there is no difference between the proceeding speed of the mold material in the first region S1 (refer to FIG. 5) and the proceeding speed of the mold material in the second region S2 (refer to FIG. 5). This is because the fluid sectional area outside the magnet is equal to the fluid sectional area between the magnet and the magnet. In this case, the weld line is minimized on an outer surface of the rotor 200.

Figure 11:
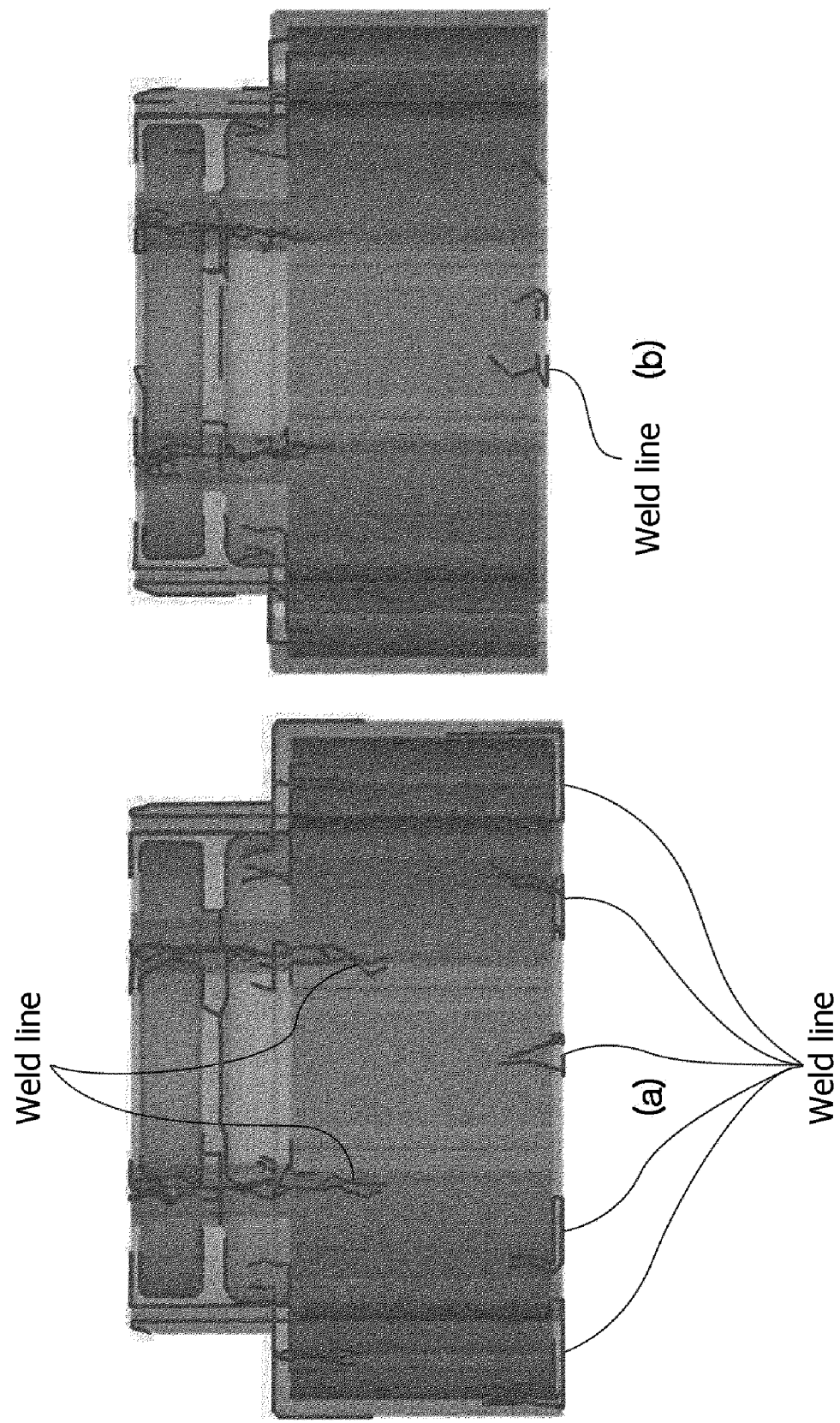
FIG. 11 is a view in which a weld line occurrence state of a cover in a general rotor and a weld line occurrence state of the cover in the rotor of the motor according to the first embodiment are compared.

FIG. 11 is a view in which a weld line occurrence state of a cover in a general rotor and a weld line occurrence state of the cover in the rotor of the motor according to the first embodiment are compared.

FIG. 11A is a view illustrating the weld line occurrence state of the cover in the general rotor, and FIG. 11B is a view illustrating the weld line occurrence state of the cover in the rotor of the motor according to the first embodiment.

Referring to FIG. 11A, it may be seen that a lot of such weld lines occur in the cover disposed outside the rotor. On the other hand, referring to FIG. 11B, it may be seen that a weld line hardly occurs in the cover disposed outside the rotor according to the first embodiment.

Figure 12:
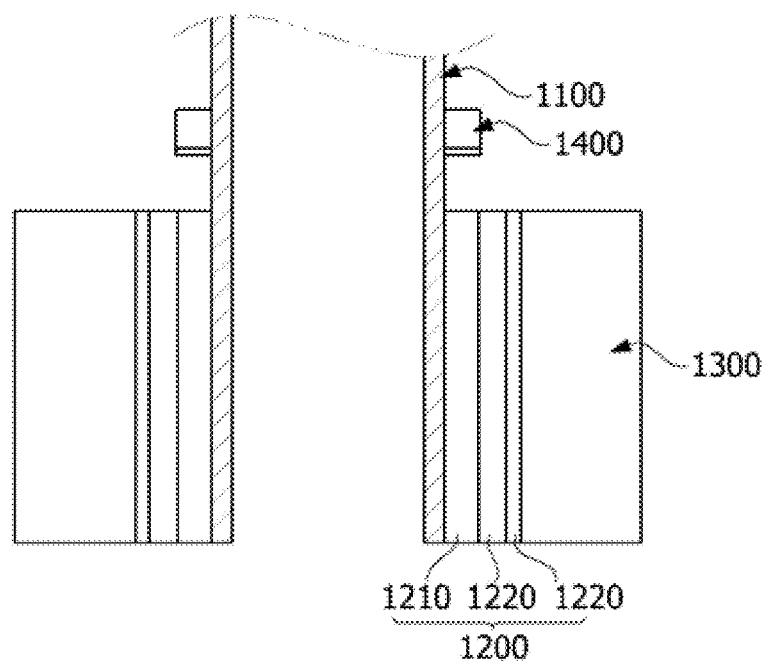
FIG. 12 is a view of a motor according to a second embodiment.

FIG. 12 is a view of a motor according to a second embodiment.

Referring to FIG. 12, the motor according to the second embodiment may include a 1100, a rotor 1200, and a stator 1300.

The rotor 1200 and the stator 1300 cause an electrical interaction. When the electrical interaction is caused, the rotor 1200 rotates and the shaft 1100 rotates in line therewith. The shaft 1100 may be connected to a DCT and provide power.

Here, unlike a single plate clutch transmission loaded in a conventional manual transmission vehicle, the DCT is a system with dual clutches in which first, third, and fifth gears may be implemented using power transmitted through one clutch and second, fourth, and sixth gears may be implemented using power transmitted through the other clutch.

The DCT may selectively receive power of the shaft 1100.

The DCT has features of providing fuel efficiency higher than that of a conventional manual transmission vehicle as well as convenient drivability and a soft transmission sense like those of a conventional automatic transmission vehicle.

Figure 13:
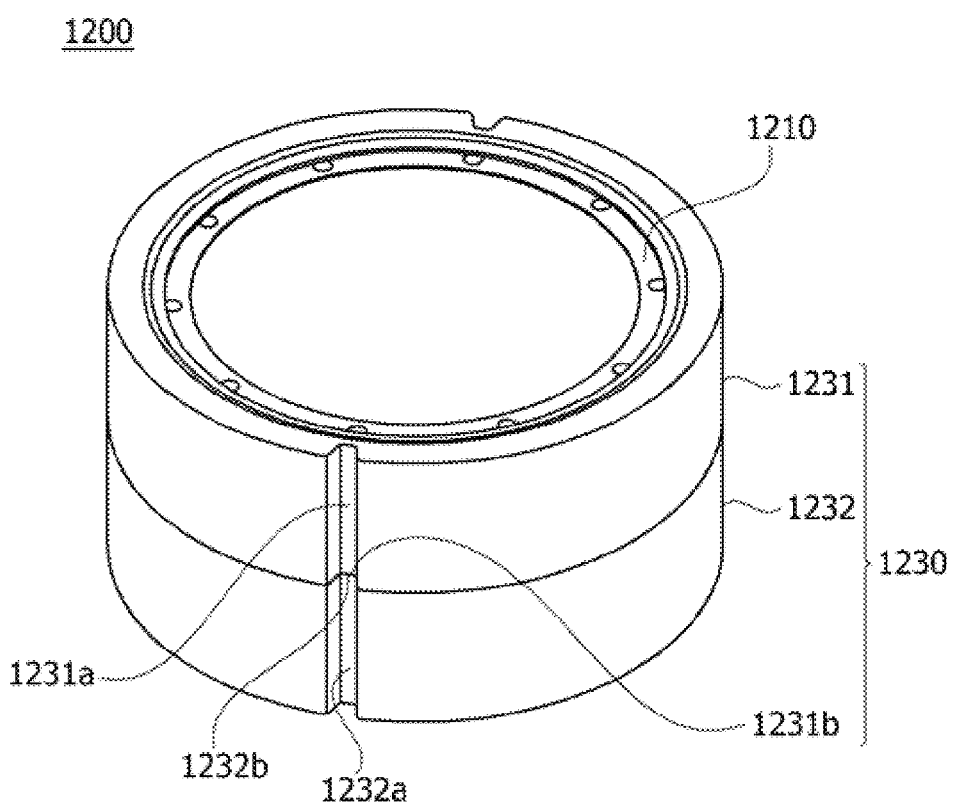
FIG. 13 is a view of a rotor of the motor according to the second embodiment.

FIG. 13 is a view of the rotor of the motor according to the second embodiment.

Referring to FIGS. 12 and 13, the rotor 1200 according to the second embodiment may include a rotor core 1210, magnets 1220, and a can member 1230. A sensor magnet 1400 is disposed above the rotor core 1210. The sensor magnet 1400 is coupled with the shaft 1100. The magnets 1220 may be coupled with an outer circumferential surface of the rotor core 1210.

The sensor magnet 1400 may be magnetized with a plurality of poles. The sensor magnet 1400 is disposed above the rotor core 1210 such that a center thereof is equal to a center C of the rotor core 1210. The sensor magnet 1400 performs a function of causing a signal for detecting a rotational position of the rotor core 1210. The sensor magnet 1400 is implemented in a ring shape. Also, the sensor magnet 1400 may include samarium cobalt.

The can member 1230 performs a function of fixing the magnets 1220 not to be separated from the rotor core 1210 by surrounding the magnets 1220. Also, the can member 1230 prevents the magnets 1220 from being exposed and physically and chemically protects the rotor core 1210 and the magnets 1220.

The can member 1230 may include a first can 1231 and a second can 1232. The first can 1231 may be mounted on one end side of the rotor core 1210. Also, the second can 1232 may be mounted on the other end side of the rotor core 1210. The first can 1231 and the second can 1232 may have cylindrical shapes, and top ends thereof may be bent to come into contact with one cross section and the other cross section of the rotor core 1210, respectively.

The first can 1231 and the second can 1232 are arranged such that a bottom end of the first can 1231 faces and comes in contact with a bottom end of the second can 1232 when the first can 1231 and the second can 1232 are mounted on the rotor core 1210. Also, the first can 1231 and the second can 1232 include groove portions 1231a and 1232a, respectively. The groove portions 1231a and 1232a may be arranged lengthwise in a height direction of the can member 1230. The height direction of the can member 1230 is a direction parallel to an axial direction of the shaft 1100 when the shaft 1100 is coupled with the rotor 1200. Also, the groove portions 1231a and 1232a are arranged concavely on an outer circumferential surface of the can member 1230.

Figure 14:
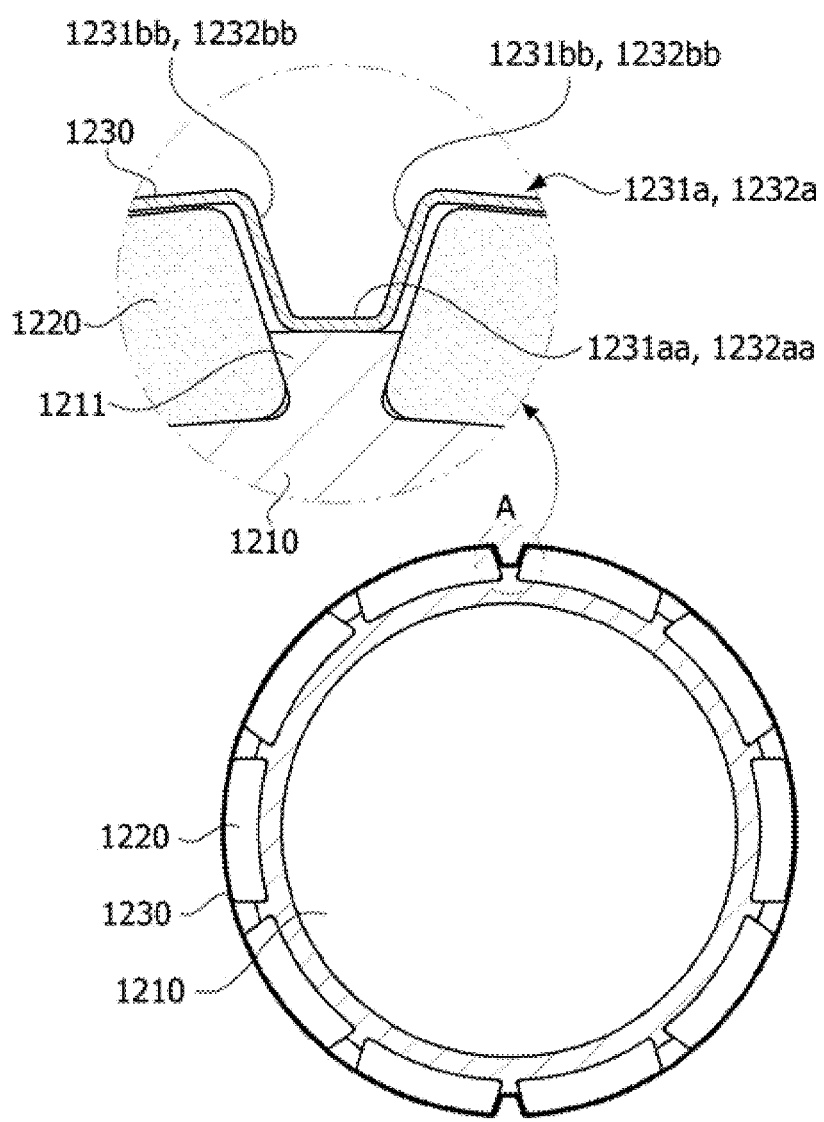
Figure 15:
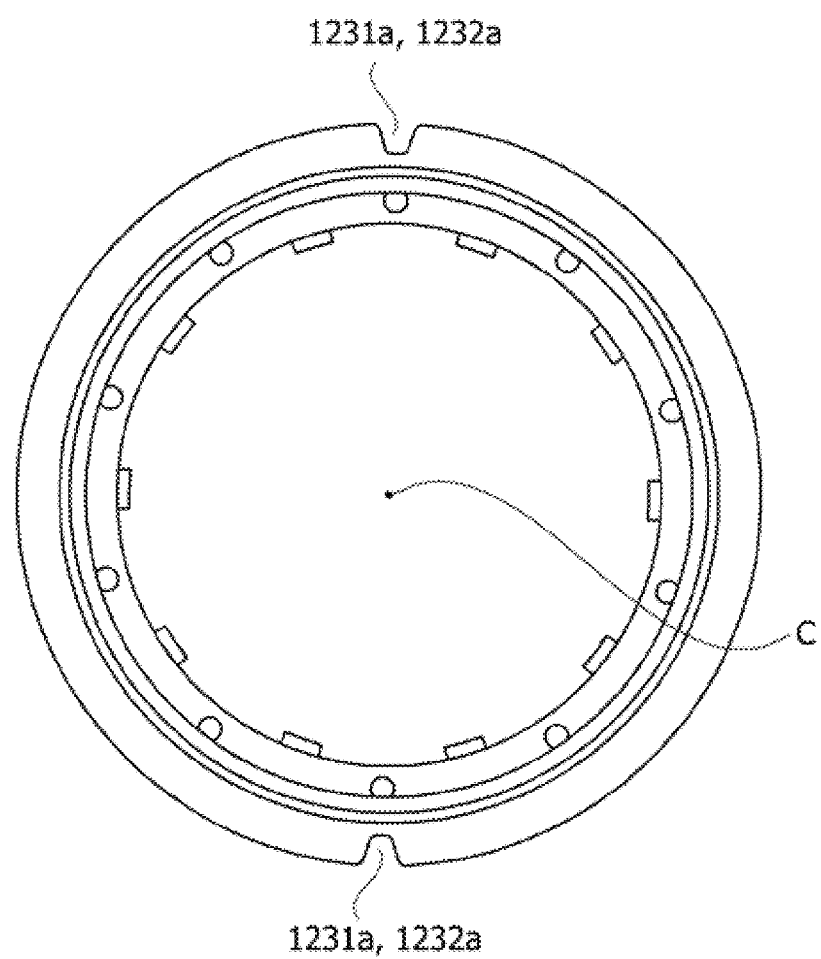
FIG. 15 is a plan view illustrating the rotor shown in FIG. 12.

FIG. 14 is a horizontal cross-sectional view illustrating the rotor shown in FIG. 12, and FIG. 15 is a plan view illustrating the rotor shown in FIG. 12.

Referring to FIGS. 12 to 15, the groove portions 1231a and 1232a are located between the magnet 1220 and the magnet 220 in a circumferential direction of the rotor 1200. The number of such groove portions 1231a and 1232a may be two. The two groove portions 1231a and 1232a may be arranged to be symmetrical on the basis of the center C of the rotor 1200. Meanwhile, the number of the groove portions 1231a and 1232a may be changed. A maximum number of the groove portions 1231a and 1232a may be equal to the number of the magnets 1220. When the number of the groove portions 1231a and 1232a is one, a problem may occur in balance and a fixing force. On the other hand, when the number of the groove portions 1231a and 1232a is excessively great, it is difficult to couple the can member 1230 with the rotor core 1210.

The can member 1230 may forcibly fit in the rotor core 1210 and the magnets 1220. When the rotor core 1210 and the magnets 1220 are covered with the can member 1230, the groove portions 1231a and 1232a of the can member 1230 move along a gap between the magnet 1220 and the magnet 1220. The groove portions 1231a and 1232a of the can member 1230 forcibly fits in not only the magnets 1220 but also the rotor core 1210.

The groove portions 1231a and 1232a may include bottom portions 1231aa and 1232aa and side portions 1231bb and 1232bb formed to be bent from both ends of the bottom portions 1231aa and 1232aa. The bottom portions 1231aa and 1232aa come into contact with the rotor core 1210. In detail, the rotor core 1210 may include guide protrusions 1211, and the bottom portions 1231aa and 1232aa may come into surface contact with the guide protrusions 1211. The side portions 1231bb and 1232bb are arranged to be spaced apart from the magnets 1220, and a space may be disposed between the side portions 1231bb and 1232bb and the magnets 1220.

The guide protrusions 1211 protrude from the outer circumferential surface of the rotor core 1210 and guides and fixes the magnets 1220. The guide protrusions 1110 may be arranged at certain intervals along a circumferential direction of the rotor core 1210.

Figure 16:
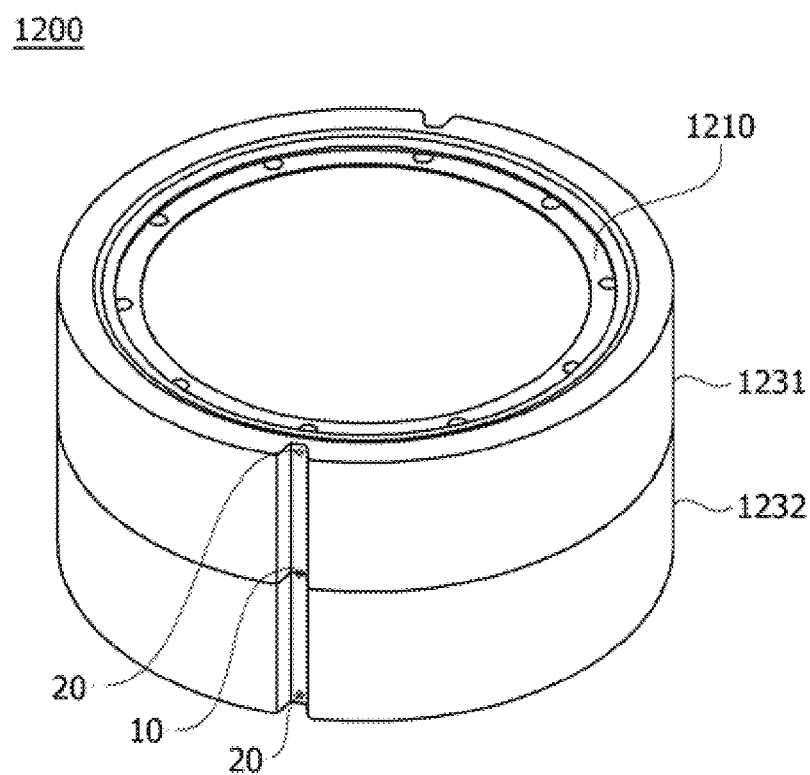
FIG. 16 is a view illustrating a first weld bead and second weld beads.

FIG. 16 is a view illustrating a first weld bead and a second weld bead.

Referring to FIGS. 12 and 16, a first weld bead 10 is formed in the groove portions 1231a and 1232a. When the first can 1231 and the second can 1232 are mounted on the rotor core 1210, a bottom end 1231b of the groove portion 1231a of the first can 1231 comes into contact with a bottom end 1232b of the groove portion 1232a of the second can 1232. In this state, when welding is performed on a boundary between the bottom end 1231b of the groove portion 1231a of the first can 1231 and the bottom end 1232b of the groove portion 1232a of the second can 1232, the first weld bead 10 is formed. The first weld bead 10 is formed by welding not only the groove portion 1231a of the first can 1231 and the groove portion 1232a of the second can 1232 but also the guide protrusions 1211 of the rotor core 1210.

Consequently, as the first can 1231, the second can 1232, and the rotor core 1210 are coupled by welding, a coupling force through welding is added to a coupling force generated by forcibly fitting of the can member 1230 such that a coupling force between the rotor core 1210 and the magnets 1220 further increases. Accordingly, without applying an adhesive to the can member 1230, robustness of the can member 1230 may be secured.

Also, additionally, second weld beads 20 are formed on the groove portions 1231a and 1232a. The second weld beads 20 may be generated by welding the bottom portion 1231aa of the groove portion 1231a of the first can 1231 with the guide protrusion 1211. Also, the second weld beads 20 may be generated by welding the bottom portion 1232aa of the groove portion 1232a of the second can 1232 with the guide protrusion.

As the first can 1231 is coupled with the rotor core 1210 through welding and the second can 1232 is coupled with the rotor core 1210 through welding, the coupling force between the rotor core 1210 and the magnets 1220 may be further increased.

Figure 17:
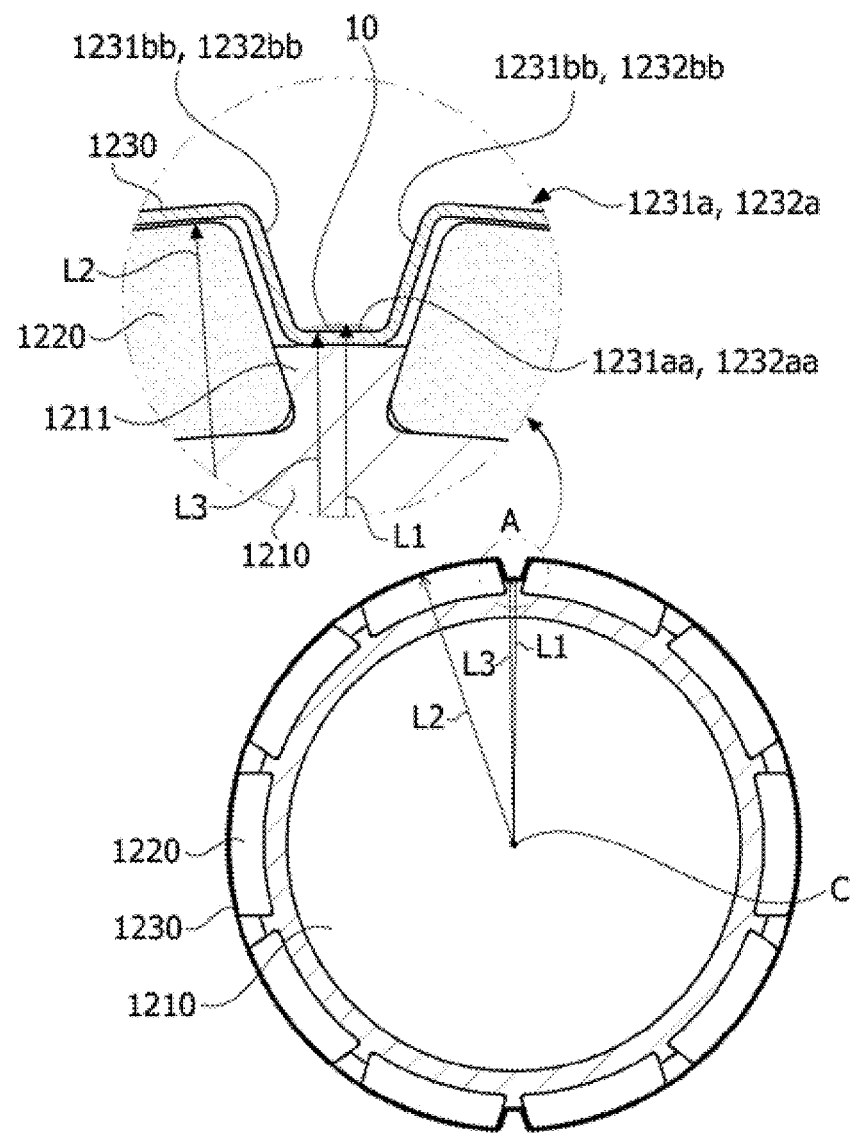
FIG. 17 is a view illustrating the first weld bead which protrudes.

FIG. 17 is a view illustrating the first weld bead which protrudes.

Meanwhile, referring to FIG. 17, a distance L1 from the center C of the rotor core 1210 to an outer circumferential surface of the first weld bead 10 may be smaller than a distance L2 from the center of the rotor core 1210 to an outer circumferential surface of the magnet 1220 and greater than a distance L3 from the center of the rotor core 1210 to an outer circumferential surface of the groove portions 1231a and 1232a. For example, the first weld bead 10 may have a convex shape.

Figure 18:
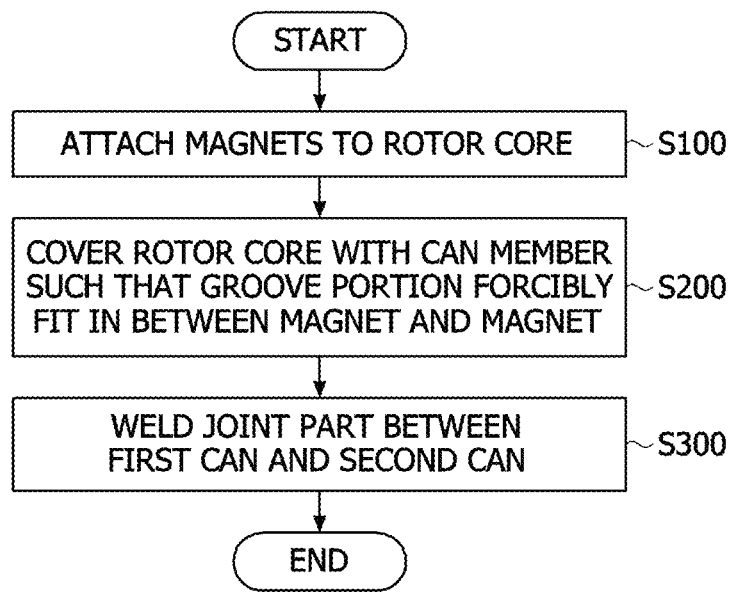
FIG. 18 is a block diagram illustrating a method of manufacturing the motor according to the second embodiment.
Figure 19:
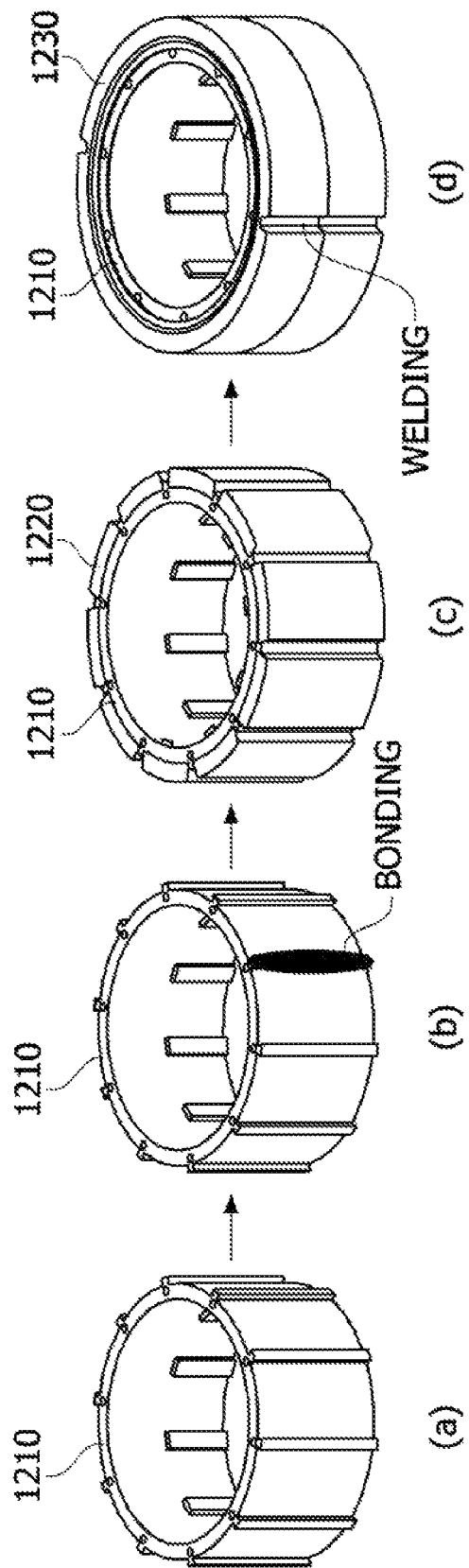
FIG. 19 is a view illustrating a process of manufacturing the motor according to the second embodiment.

FIG. 18 is a block diagram illustrating a method of manufacturing the motor according to the second embodiment, and FIG. 19 is a view illustrating a process of manufacturing the motor according to the second embodiment.

Referring to FIGS. 18 and 19A, the rotor core 1210 is manufactured. Referring to FIGS. 18 and 19B, an adhesive is applied to an outer circumferential surface of the rotor core 1210. Also, referring to FIGS. 18 and 19C, the magnets 1220 are attached to the outer circumferential surface of the rotor core 1210 (S100).

Referring to FIGS. 18 and 19D, the rotor core 1210 is covered with the can member 1230 such that the groove portions 1231a and 1232a forcibly fit in between the magnet 1220 and the magnet 1220 (S200).

Referring to FIGS. 18 and 19D, a joint part between the first can 1231 and the second can 1232 is welded (S300).

A rotor and a motor including the rotor according to one exemplary embodiment of the present invention have been described above in detail with reference to the attached drawings.

The above description is exemplarily describing the technical concept of the present invention, and a variety of modifications, changes, and substitutions may be made by one of ordinary skill in the art to which the present invention pertains without departing from the essential features of the present invention. Accordingly, the embodiment disclosed herein and the attached drawings are intended not to limit but to describe the technical concept of the present invention, and the scope of the technical concept of the present invention is not limited to the embodiments and the attached drawings. The scope of the present invention should be construed by the following claims and all technical concepts within the equal range thereof should be construed as being included in the extent of right of the present invention.

The invention claimed is:
1. A rotor comprising:
a rotor core;
a plurality of magnets arranged outside the rotor core; and
a cover disposed outside the plurality of magnets,
wherein the rotor core comprises a plurality of guide protrusions disposed between the plurality of magnets, wherein a distance from a center of the rotor core to an outer surface of the cover through a center of one the plurality of guide protrusion is smaller than a distance from the center of the rotor core to the outer surface of the cover through a center of one of the plurality of magnets, wherein the rotor further comprises a sensor magnet disposed above the rotor core, wherein the cover is disposed outside the sensor magnet, and wherein a thickness of the cover disposed outside the plurality of magnets based on a radial direction of the center of the rotor core is smaller than a thickness of the cover disposed outside the sensor magnet.

2. The rotor of claim 1, wherein a cross section of the cover taken along a direction perpendicular to a longitudinal direction of the plurality of magnets comprises a convex portion and a concave portion, and wherein the convex portion and the concave portion are alternately arranged.

3. The rotor of claim 2, wherein a center of the concave portion is disposed outside the rotor core.

4. A motor comprising:
a shaft;
a rotor comprising a hole in which the shaft is disposed; and
a stator disposed outside the rotor,
wherein the rotor comprises:
a rotor core;
a plurality of magnets arranged outside the rotor core; and
a cover disposed outside the plurality of magnets,
wherein the rotor core comprises a plurality of guide protrusions disposed between the plurality of magnets,
wherein a distance from a center of the rotor core to an outer surface of the cover through a center of one the plurality of guide protrusion is smaller than a distance from the center of the rotor core to the outer surface of the cover through a center of one of the plurality of magnets, wherein the cover is a can member, wherein the can member comprises a first can and a second can disposed at both ends of the rotor core, wherein the first can and the second can are arranged so that a bottom end of the first can comes into contact with a bottom end of the second can, and wherein the first can and the second can comprise a first weld bead disposed through the bottom end of the first can and the bottom end of the second can.

5. The motor of claim 4, wherein the rotor core comprises a plurality of guide protrusions, and wherein the plurality of guide protrusions protrude from an outer circumferential surface of the rotor core in a radial direction of the rotor core and are arranged along an axial direction of the shaft.

6. The motor of claim 4, wherein the can member comprises a groove portion, and wherein the groove portion comprises a bottom surface and sidewalls disposed on both ends of the bottom surface.

7. The motor of claim 5, wherein the can member comprises a groove portion, wherein the groove portion comprises a bottom surface and sidewalls disposed on both ends of the bottom surface, and wherein the bottom surface of the groove portion comes into contact with the plurality of guide protrusions.

8. The motor of claim 7, wherein the sidewalls are disposed to be spaced apart from the plurality of magnets.

9. The rotor of claim 1, wherein the sensor magnet has a ring shape.

10. The rotor of claim 1, wherein the sensor magnet includes a hole in a center thereof through which a shaft passes.

11. The rotor of claim 2, wherein the concave portion is arranged to be symmetrical based on the center of the rotor core.

12. The rotor of claim 2, wherein a thickness of the convex portion is equal to a thickness of the concave portion.

* * * * *